United States Patent Office 3,594,122
Patented July 20, 1971

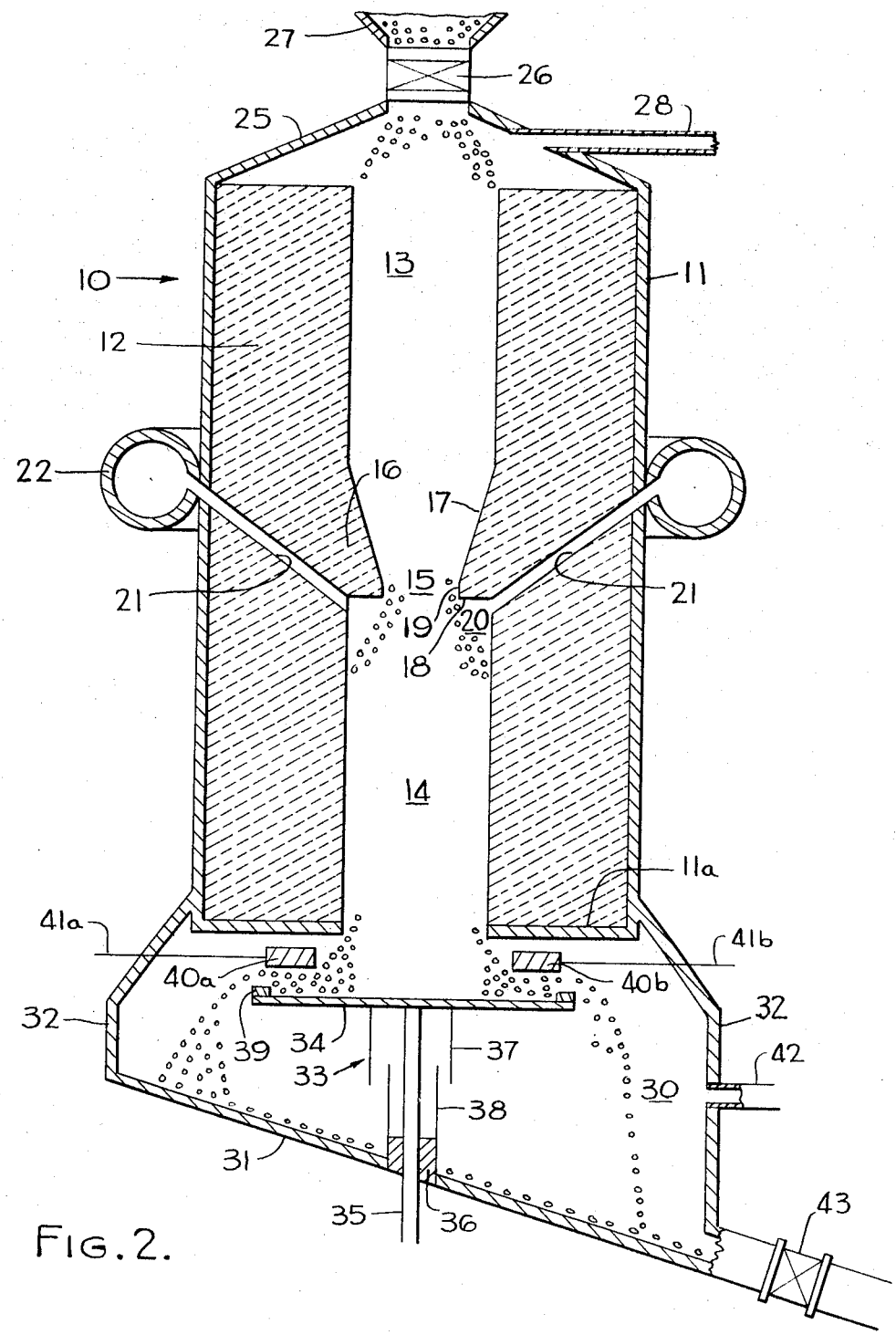

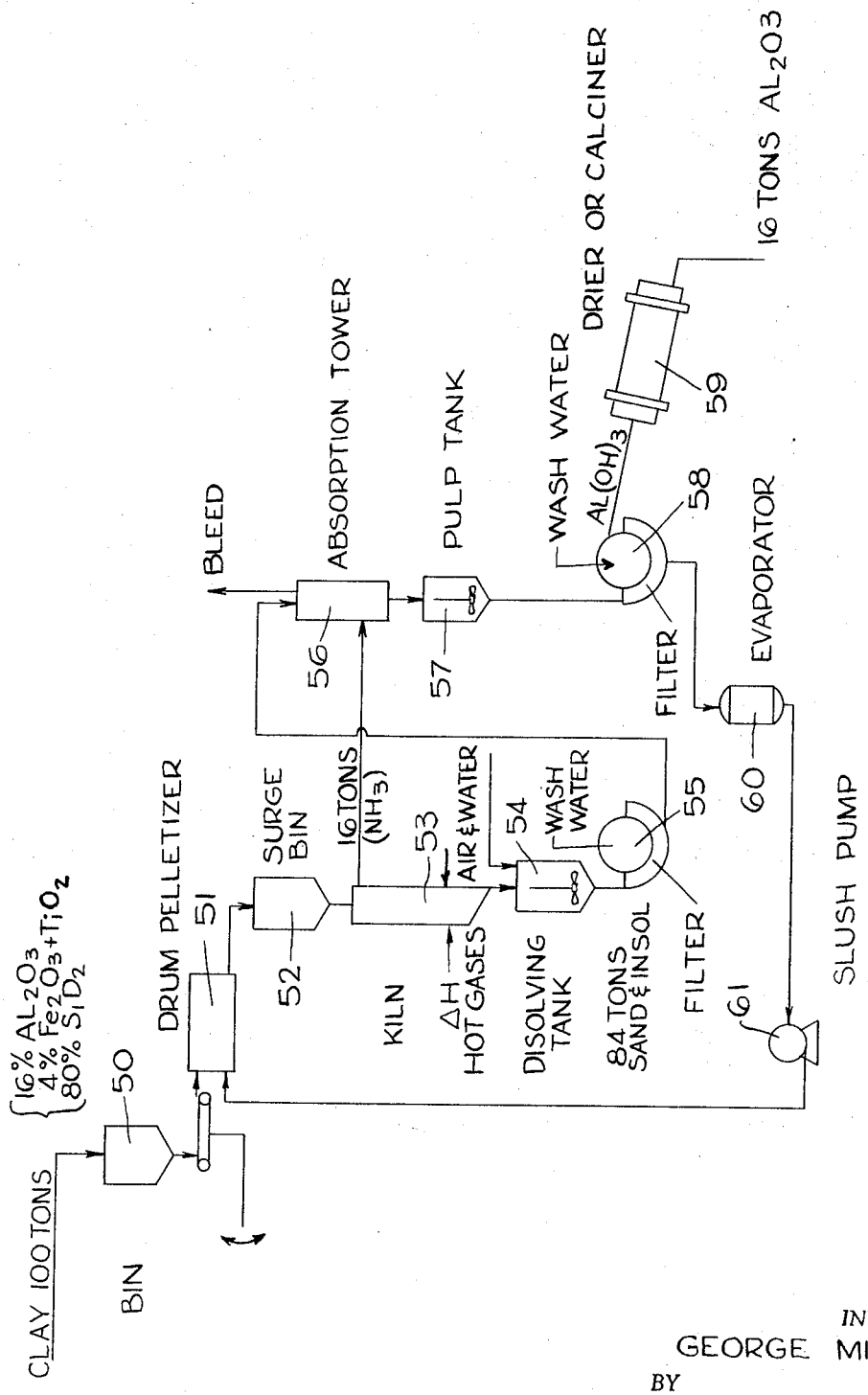

3,594,122
PROCESS FOR EXTRACTION OF ALUMINA FROM ALUMINA-CONTAINING ORE
George Miller, Bogota, Colombia, assignor to Ethyl C. Fornes, Springville, N.Y.
Filed July 28, 1969, Ser. No. 845,169
Int. Cl. C01f 7/10; C22b 1/06
U.S. Cl. 23—143                                    6 Claims

ABSTRACT OF THE DISCLOSURE

Ammonium sulphate is added to alumina-bearing ore, such as clay, in stoichiometric proportion to the amount of alumina present in the ore, the mixture is pelletized, and the pellets, preferably about one inch in diameter are heated in a specially constructed plugged flow furnace to a temperature above the decomposition temperature of iron sulphate and below the decomposition temperature of aluminum sulphate. Upon cooling, the pellets are placed in water to form an aluminum sulphate solution which is filtered and then reacted with ammonia gas to form a precipitate of aluminum hydroxide which can be filtered, washed and dried. The furnace or kiln includes upper and lower chambers of the same diameter and a reduced diameter intermediate chamber. Hot gases are introduced by tuyeres communicating with an annular space defined at the juncture between the intermediate and lower chambers. A rotating table in combination with adjustable drag bars both located below the lower chamber control the rate of flow of material through the furnace.

BACKGROUND OF THE INVENTION

The present invention relates to a process and apparatus for extracting alumina from ores such as clay.

One common alumina-bearing ore is clay and it is known that refractory clay material can be disgregated by fusing it with ammonium sulphate. Attempts to utilize this process, for example in the commercial production of alum, have been unsuccessful for several reasons. A highly corrosive paste is present and cannot be handled in ordinary furnaces. In addition, the reactants allow an undesirably low heat transfer and they often adhere to the furnace walls.

Alumina-bearing ores such as clay include impurities, for example iron and titanium, which must be removed if a commercially desirable end product is to result. In many processes heretofore proposed, the impurities remain with the aluminum compound through the early and intermediate stages of the process and then are separated during a subsequent stage and at a point when such separation is relatively uneconomical.

SUMMARY OF THE INVENTION

It is, therefore, an object of this invention to provide a process and apparatus for extracting alumina from ores such as clay which, once begun, needs only fuel and ore as additional raw materials and which process results in an end product having a high degree of purity.

It is a further object of this invention to provide such a process which is unhampered by corrosive intermediate-products and in which the reactants thereof move freely through the kiln or furnace in which they are heated.

It is a further object of this invention to provide a kiln or furnace for a process of the type provided by the present invention for heating a pelletized charge uniformly and for controlling the flow of charge therethrough to an exact degree.

The present invention provides a process wherein ammonium sulphate is added to alumina-bearing ore, such as clay, in stoichiometric proportion to the amount of alumina present in the ore, the mixture is pelletized, and the pellets are heated to a temperature above the decomposition temperature of iron sulphate and below the decomposition temperature of aluminum sulphate. Upon cooling, the pellets are placed in water to dissolve the aluminum sulphate, the resulting solution is filtered, and the filtered solution is reacted with ammonia gas to form a precipitate of alumina hydroxide. Heating of the pellets is accomplished in a shaft kiln wherein hot gases are introduced through an annular recess or space providing a continuous surface of initial exposure to the pellets. The flow of pellets through the furnace is controlled by first diverting the flow from an axial to a radial outward direction and then by retarding the radial outward flow to a controlled degree.

The foregoing and additional advantages and characterizing features of the present invention will become clearly apparent upon a reading of the ensuing detailed description of an illustrative embodiment thereof together with the included drawing depicting the same.

BRIEF DESCRIPTION OF THE DRAWING FIGURES

FIG. 2 is a sectional view showing a furnace specially constructed for use in carrying out the process of the present invention; and FIG. 3 is a schematic flow diagram illustrating the process of the present invention.

DETAILED DESCRIPTION OF AN ILLUSTRATIVE EMBODIMENT

Figure 1:
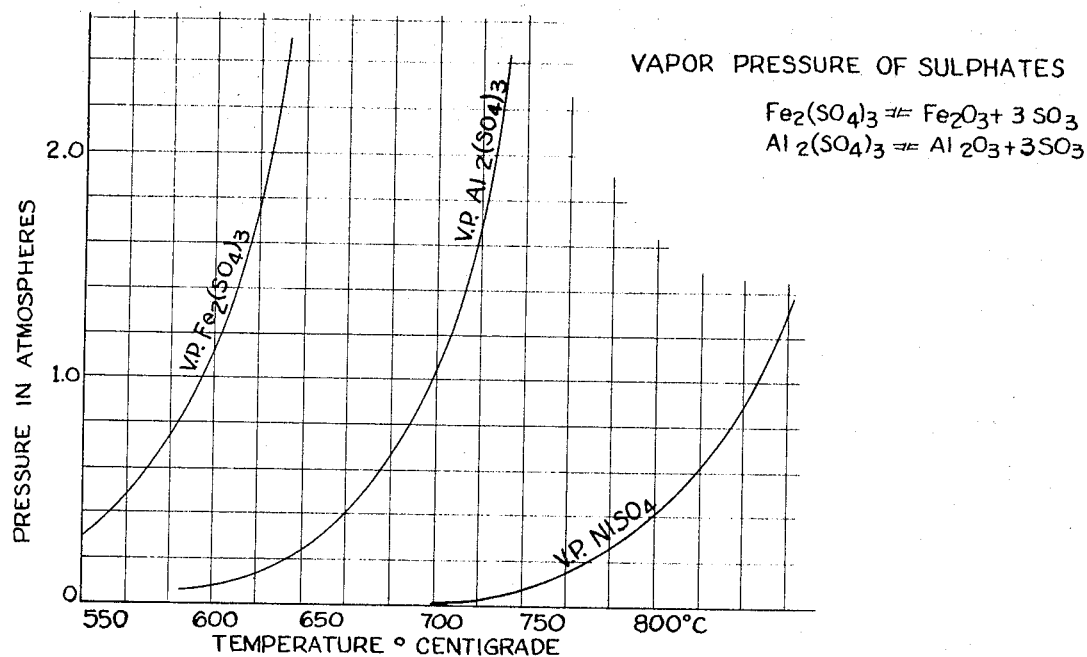
FIG. 1 is a graph showing the equilibrium decomposition of various sulphates at given vapor pressures and as a function of temperature.

The process of extracting alumina according to the present invention is begun by taking an alumina-bearing ore, one common example being clay, and mixing the ore with ammonium sulphate in near stoichiometric proportion equivalent to the alumina present in the ore. The resulting mixture is then pelletized, for example in a drum pelletizer, to produce pellets preferably having a diameter in the range from 0.25 to 1.25 inch. The pellets then are heated at a temperature above the decomposition temperature of iron sulphate and below the decomposition temperature of aluminum sulphate. To heat the pellets to this temperature, preferably 600 degrees centigrade, they are fed into a plugged flow furnace or kiln which is specially constructed for this type of process, where they move in a direction counter to a hot stream of gases. The construction and operation of the kiln will be described in detail further on in the specification.

The next step in the process is cooling of the pellets. In particular, after reaching the temperature of 600 degrees centigrade the pellets continue to flow down the plugged flow kiln where they are cooled by a flow of cold air and are discharged at a substantially lower temperature. The gases emitted from the top of the kiln contain all of the ammonia gas resulting from the reaction of the ammonium sulphate with the ore. Dust is removed from these gases and the ammonia recovered for use in a subsequent stage of the process.

After cooling of the pellets, the next step in the process of the present invention consists of placing the cooled pellets in water for a time sufficient to dissolve all of the aluminum sulphate present in the pellets. The speed at which a solution is formed can, of course, be enhanced by agitation, as by stirring of the water and pellets. Next, the solution is filtered by suitable means to remove any insoluble silica, iron or other undesirable impurities. If any traces of iron and titanium remain after the step of filtering, a short boiling will coagulate them whereupon they can be removed by a second step of filtering. It has been found, however, that proper operation of the plugged flow furnace, which will be described presently, renders this additional step of boiling followed by a second filtering unnecessary.

The filtered pure aluminum sulphate solution then is reacted with ammonia gas to form a precipitate of aluminum hydroxide. Advantageously, the ammonia gas exhausted from the kiln during an earlier step of the process can be absorbed by the solution. The reaction also produces ammonium sulphate which is used again with the next batch of alumina-bearing ore. The aluminum hydroxide of course is filtered, washed and dried.

The alumina extraction process provided by the present invention is desirably simple and economical. Once begun, the process requires as additional ray materials only alumina-bearing ore and fuel for operating the kiln. By pelletizing low grade alumina ores mixed with a stoichiometric amount of ammonium sulphate, the liquid ammonium sulphate thus formed is retained within the pores of the pellets. As a result, there is no sticking or adhering of the pellets to each other or to the inner walls or surfaces of the kiln. It should be noted that if the ore is of very high grade, not even stoichiometric amounts of ammonium sulphate can be used due to lignification. To prevent lignification, the high grade ores must be mixed with inert materials or a portion of the ore recirculated during the process.

Another important step in the process of the present invention is heating the reacted material above the temperature of decomposition of iron sulphate formed, and below the temperature of decomposition of aluminum sulphate formed. If this is not done the aluminum hydroxide will be contaminated with iron hydroxide in subsequent steps making difficult a later separation. As previously mentioned the temperature preferably is 600 degrees centigrade, but other temperatures within a permissible range can be used. The graph of FIG. 1 provides information as to this range when the known pressure is within the range of about 0.2 to about 2.4 atmosphere.

A plugged flow furnace or shaft kiln 10 specially constructed for this type of process is shown in FIG. 2. Kiln comprises an outer, hollow cylindrical shell 11 which is lined inside with a relatively thick, hollow cylindrical layer of refractory material 12. Shell 11 is provided with an inwardly extending lip 11a for the purpose of supporting layer 12. Refractory layer 12 thus defines an upper chamber 13 and a lower chamber 14 both of substantially the same diameter. Refractory layer 12 about midway along the axial length thereof extends inwardly or necks downwardly to define a smaller diameter chamber 15 axially located between chambers 13 and 14. In particular, refractory layer 12 is provided with an annular ledge 16 on the inner surface thereof of substantially smaller axial length than the length of layer 12 which ledge 16 includes a first surface 17 extending at a relatively small acute angle from the inner surface of layer 12 in a direction toward the central, longitudinal axis of furnace 10, and a second annular surface 18 disposed in a plane perpendicular to the longitudinal axis of kiln 10 and extending inwardly from the surface of layer 12. In this particular illustration surfaces 17 and 18 of enlargement 16 meet in a third annular surface 19 of relatively narrow axial length extending parallel to the axis of kiln 10. By virtue of this construction an annular space 20 is defined in the inner wall of layer 12 between the inlet and outlet by means of surface 18 of ledge 16, the inner wall or surface of refractory layer 12 which defines lower chamber 14, and the angle of repose of the pellets or spheres of the material traveling through kiln 10. The angle of repose is included between a line joining the centers of the spheres or pellets as they travel from enlargement 16 back toward the inner wall of layer 12 and a line disposed along the inner wall. Surface 18 should be made as perpendicular as possible to the lower inner wall of refractory layer 12 to maximize annular space 20.

A plurality of circumferentially-spaced conduits or tuyeres 21 are provided through shell 11 and refractory layer 12 which tuyeres communicate with annular space 20. Each tuyere is oriented so that the longitudinal axis thereof is disposed at an angle perpendicular to a line coincident with the angle of repose of the pellets at space 20. Hot gases from a suitable source are distributed to tuyeres 21 by an annular conduit 22 communicating therewith and surrounding kiln 10 at about the mid-section thereof. Upper chamber 13 of kiln 10 is made of sufficient height or axial length to allow for a good contact time between uncalcined pellets or spheres and the hot gases.

Kiln 10 is provided at the top or inlet portion thereof with a cover 25, and an air lock 26 extends through the central portion of cover 25. A bin 27 communicates with air lock 26, and pellets stored in bin 27 are fed into kiln 10 at the upper chamber 13 thereof under control of air lock 26. A duct 28 extending through cover 25 transmits ammonia and other gases produced in kiln 10 to equipment used in other stages of the process.

Kiln 10 is provided at the bottom or outlet portion thereof with a chamber 30 defined by an inclined lower or bottom wall 31 and generally upstanding wall 32 which extends from inclined wall 31 into contact or attachment with shell 11. Included within chamber 30 are flow defining means including a flow diverting element or discharge gyratory table 33 comprising a disc 34 having a diameter greater than the diameter of the lower chamber 14 which disc is spaced below the outlet of chamber 14 so as to be in the path of the moving pellets and disposed in a plane generally perpendicular with respect to the axis of kiln 10. Disc 34 is supported by a shaft 35 attached at one end thereof to the underside of disc 34, and shaft 35 extends through a gasket 36 and an aperture provided in wall 31 at the other end to suitable drive means for rotation thereof. A skirt 37 extending downwardly from disc 34 and surrounding shaft 35 and a skirt 38 concentric with shaft 35 and extending upwardly from wall 31 as shown in FIG. 2 are provided to prevent dust from entering gasket 36. Disc 34 is provided with a ring 39 around the periphery of the top surface to prevent the spheres or pellets from rolling off table 34 and thus emptying kiln 10 prematurely. The flow controlling means further comprises flow retarding means, positioned between the outlet of chamber 14 and flow diverting element 33, in the form of a plurality of drag bars, two of which are designated 40a and 40b in FIG. 2. Drag bars 40 are adjustably positioned in a direction perpendicular to the axis of kiln 10 between lip 11a of sleeve 11 and table 33 by means of supporting rods 41a and 41b, respectively, extending through upstanding wall 32 and which are movable for a purpose to be described. While only two drag bars are shown in FIG. 2, it is to be understood that more are included, circumferentially spaced around disc 34, the total number as well as the individual shape and size depending upon the size of kiln 10. A duct 42 extends through upstanding wall 32 for the purpose of introducing cooling air into chamber 30, and an air lock 43 is provided at the lower end of inclined bottom wall 31 for the purpose of discharging pellets from kiln 10.

In operation, a charge of material to be treated, such as the pelletized mixture of ammonium sulphate in stoichoimetric proportion with alumina-bearing ore in the form of clay, passes downwardly through kiln 10 in counter current flow to an upward moving stream of hot gas which gas enters the interior of kiln 10 through tuyeres 21. The rate of flow of the pellets or nodules through kiln 10 is controlled by turn table 33 and drag bars 40a and 40b. In particular, the flow is first diverted from an axial to a radially outward direction by table 33 and then the radial outward flow is retarded by drag bars 40a and 40b to a controlled degree. The rate of movement of the column of pellets depends upon the speed of rotation of table disc 34 and on the position of drag bars 40a and 40b. Control of hot gases through tuyeres 21 and of cooling air through conduit 42 is affected by conventional valving arrangements, not shown. Temperature control can be effected by means of thermocouple arrangements suitably placed in proximity to middle chamber 15, for example in ledge 16. The limiting velocity of the gases in kiln 10 has been found to be about somewhat less than one-tenth of the free falling velocity of the pellets or nodules.

Kiln 10 is specially constructed for the heating of pelletized material—in fact, the smaller diameter middle chamber 15 defined by ledge 16 does not allow the use of unpelletized material because of the danger of bridging. The use preferably of spherical pellets or nodules which have only six points of contact between themselves, and the inclusion of turntable 33 plus multiple drag bars 40a and 40b, insure a continuous movement of material through kiln 10 thereby preventing bridging. This, in turn, allows the temperature in the upper zone of kiln 10 to reach the melting temperature of ammonium sulphate so as to exude the resulting molten ammonium sulphate to the surface of the pellets or nodules without causing bridging.

In addition, by having fairly uniform sized pellets, preferably about one inch in diameter, ample space is provided for the flow of gases through the column of material, thereby providing a high capacity kiln. While the size of the pellets is not critical in the process of the present invention, nevertheless the pellets should be in the range of not less than 0.25 inch diameter, to prevent excessive pressure drop and problems of fluidization within the furnace, and of not greater than 1.25 inch diameter so as not to incur low rates of heat transfer within the pellets which would require excessive height of the furnace or kiln.

In the process provided by the present invention, the temperature at the center of each pellet must reach 600 degrees centigrade in order to decompose all of the iron sulphate present. The fact that this is a continuous flow process causes the temperature to increase gradually from the outer surface of the pellets toward the center thereof. When the pellets reach the hottest zone of the furnace, the pellet skin temperature is about 625–650 degrees centigrade when the temperature at the center reaches the required 600 degrees. The holding time of the pellets within furnace is determined by the furnace size and rate of production.

By way of example, a furnace was constructed having an overall height of 30 feet of which 20 feet comprise the upper section and 10 feet the lower chamber. The upper and lower chambers 13 and 14, respectively, each have a diameter of 3.5 feet and the diameter of the middle or reduced diameter region 15 is 2.5 feet. This furnace, when used in the process of the present invention and with pellets having a diameter of one inch, was found to have a production rate of 100 tons of pellets per day. The furnace heats the pellets up to a temperature of 625 degrees centigrade and the speed of rotation of table 33 in the furnace is between 4 to 10 revolutions per minute.

By virtue of this construction of kiln 10, the pellets or nodules passing therethrough are heated uniformly to the required temperature. The annular space 20 defined by ledge 16 and the angle of repose of the pellets passing through provides a continuous area or volume of initial contact or exposure between heated gases and nodules. This area has a dimension nearly equal the inner circumference of shell 12 and is of course greater than the sum of the individual cross sectional areas of tuyeres or conduits communicating with the interior of kiln 10. As a result, the portion of the inner wall of refractory layer 12 exposed to annular space 20 is not contacted by the charge of material as it passes through furnace 10. The arrangement of turntable 33 and drag bars 40 at the lower end of kiln allow precise control of the rate of movement of material through kiln 10, which control is effected by first diverting the flow from an axial to a radial outward direction and then by retarding the radial outward flow to a controlled degree.

The process of the present invention will be illustrated in further detail by way of a specific example and in conjunction with the flow diagram of FIG. 3. The alumina-bearing ore used is clay containing 16 percent $Al_2O_3$, 4 percent oxides of iron and titanium, and 80 percent silicon oxide or sand. One hundred tons per day of the clay from a storage bin 50 is mixed with a slush containing 62 tons per day of ammonium sulphate in a drum pelletizer 51. Pelletizer 51 delivers one-inch diameter pellets to a surge bin 52 which, in turn, feeds a plugged flow kiln 53 to which are supplied hot gases and cooling air as indicated in FIG. 3. Kiln 53 is identical in construction and operation to kiln 10 shown in FIG. 2 and described previously. When the pellets are heated in kiln 53 to a temperature above the decomposition temperature of iron sulphate, ammonia gas is given off in an amount by weight of 16 tons per day.

Upon leaving the kiln or furnace 53, the pellets then are fed to a dissolving tank 54 containing water wherein a solution of aluminum sulphate is formed. The solution together with insoluble material is then fed to a filter 55 where sand and other insoluble materials are discarded. In particular, 84 tons per day of sand and other insoluble materials are removed by filter 55. The filtered aluminum sulphate solution then is transmitted to an absorption tower 56 where it is reacted with ammonia gas obtained as a product from heating of the pellets in kiln 53 as indicated in FIG. 3. There is formed in tower 56 ammonium sulphate solution plus aluminum hydroxide precipitate, both of which are delivered to a pulp tank 57 which, in turn, delivers an aluminum hydroxide suspension to a filter 58 where it is filtered and washed. The aluminum hydroxide then is delivered to a drier 59 which drys or calcines it to make the final product, $Al_2O_3$. In this particular example, 16 tons per day of $Al_2O_3$ are obtained. The filtrate from the aluminum hydroxide in filter 58 is fed to an evaporator 60 where a slush of ammonium sulphate is produced. The slush is then delivered with the aid of a pump 61 back to pelletizer 51 as illustrated in FIG. 3 to be used again.

While one embodiment of the present invention has been described in detail, this has been done by way of illustration without thought of limitation.

What is claimed is:

1. A process for extracting alumina from clay or other alumina-bearing ores comprising the steps of:
    (a) adding to clay or like alumina-bearing ore ammonium sulphate in near stoichiometric proportion to the amount of alumina present in the ore;
    (b) pelletizing the resulting mixture to produce pellets in the range of about 0.25 to about 1.25 inch diameter;
    (c) heating the pellets to a temperature above the decomposition temperature of iron sulphate and below the decomposition temperature of aluminum sulphate;
    (d) cooling the pellets;
    (e) placing the cooled pellets in water for a time sufficient to dissolve all the aluminum sulphate present in the pellets;
    (f) filtering the resulting solution; and
    (g) reacting the filtered solution with ammonia gas to form a precipitate of aluminum hydroxide.

2. The process defined in claim 1 further including the step of filtering the precipitate of aluminum hydroxide.

3. The process defined in claim 2 further including the step of drying the filtered precipitate of aluminum hydroxide.

4. The process defined in claim 1 wherein said step of heating the pellets includes moving the pellets in a direction counter to the flow of gas heated to said temperature.

5. The process defined in claim 1 further including the step of recovering ammonia gas released during said step of heating and utilizing the ammonia gas for said step of precipitating.

6. The process defined in claim 2 further including the step of recovering ammonium sulphate during said step of filtering the precipitate of aluminum hydroxide and utilizing the ammonium sulphate during said step of adding to clay or other ore.

References Cited
UNITED STATES PATENTS

| | | | |
|---|---|---|---|
| 914,187 | 3/1909 | Rinman | 23—123 |
| 1,914,176 | 6/1933 | Steuart | 23—123 |
| 2,436,771 | 2/1948 | Hood | 23—146X |
| 2,551,944 | 5/1951 | Haff | 23—143 |
| 3,027,233 | 3/1962 | Michalko | 23—143 |
| 3,112,995 | 12/1963 | Hoekstra | 23—143 |
| 3,317,277 | 5/1967 | Cosgrove | 23—143 |

FOREIGN PATENTS

| | | | |
|---|---|---|---|
| 514,149 | 10/1939 | Great Britain | 23—123 |

ALLEN B. CURTIS, Primary Examiner

U.S. Cl. X.R.

23—123; 266—25